(12) United States Patent
Gerstner et al.

(10) Patent No.: US 11,990,302 B2
(45) Date of Patent: May 21, 2024

(54) CIRCUIT BREAKER, REMOVABLE DISPLAY, AND ELECTRONIC TRIP UNIT FOR A CIRCUIT BREAKER

(71) Applicant: Siemens Aktiengesellschaft, Munich (DE)

(72) Inventors: Michael Gerstner, Röttenbach (DE); Bernd Schwinn, Fürth (DE); Anand Venkatramani, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/043,382

(22) PCT Filed: Jul. 27, 2021

(86) PCT No.: PCT/EP2021/071028
§ 371 (c)(1),
(2) Date: Feb. 28, 2023

(87) PCT Pub. No.: WO2022/042980
PCT Pub. Date: Mar. 3, 2022

(65) Prior Publication Data
US 2023/0326699 A1    Oct. 12, 2023

(30) Foreign Application Priority Data
Aug. 31, 2020  (DE) ............ 10 2020 210 973.7

(51) Int. Cl.
*H01H 71/12*    (2006.01)
*G06F 3/0346*   (2013.01)
*G06F 3/147*    (2006.01)
*H01H 71/04*    (2006.01)

(52) U.S. Cl.
CPC ......... *H01H 71/123* (2013.01); *G06F 3/0346* (2013.01); *G06F 3/147* (2013.01); *H01H 71/04* (2013.01)

(58) Field of Classification Search
None
See application file for complete search history.

(56) References Cited

U.S. PATENT DOCUMENTS

| 4,870,531 | A  | 9/1989 | Danek |
| 4,945,443 | A  | 7/1990 | DeBiasi et al. |
| 6,406,328 | B1 | 6/2002 | Attarian et al. |
| 8,928,186 | B2 | 1/2015 | Manzoli et al. |

(Continued)

FOREIGN PATENT DOCUMENTS

| DE | 3926414 B4 | 2/2006 |
| DE | 102014217292 A1 | 3/2016 |

(Continued)

*Primary Examiner* — Nicholas J Lee
(74) *Attorney, Agent, or Firm* — Laurence A. Greenberg; Werner H. Stemer; Ralph E. Locher

(57) ABSTRACT

The invention relates to a circuit breaker for a low-voltage circuit having input and output terminals for conductors of the low-voltage circuit. Within the circuit breaker, the low-voltage circuit can be interrupted or closed. The circuit breaker also has a current sensor which determines the level of the electrical current in the low-voltage circuit and is connected to an electronic trigger unit which has a display for displaying information and interrupts the low-voltage circuit if current limit values or current-time limit values are exceeded. The display is designed to be removable.

17 Claims, 1 Drawing Sheet

(56) References Cited

U.S. PATENT DOCUMENTS

| | | |
|---|---|---|
| 9,966,754 B2 | 5/2018 | Franke et al. |
| 9,991,079 B2 | 6/2018 | Franke et al. |
| 10,199,195 B2 | 2/2019 | Borgwardt |
| 10,209,280 B2 | 2/2019 | Borgwardt et al. |
| 10,218,167 B2 | 2/2019 | Franke et al. |
| 10,680,428 B2 | 6/2020 | Geissler et al. |
| 10,685,803 B2 | 6/2020 | Kupsch et al. |
| 10,804,045 B2 | 10/2020 | Franke et al. |
| 10,916,929 B2 | 2/2021 | Kopaczewski et al. |
| 11,017,968 B2 | 5/2021 | Franke et al. |
| 11,133,142 B2 | 9/2021 | Stehle |
| 2010/0296221 A1 | 11/2010 | Shah et al. |
| 2011/0186408 A1 | 8/2011 | Manzoli et al. |
| 2012/0109343 A1 | 5/2012 | Shah |
| 2016/0063822 A1 | 3/2016 | Schwinn et al. |
| 2016/0064915 A1 | 3/2016 | Schwinn |
| 2016/0379786 A1 | 12/2016 | Franke et al. |
| 2019/0385806 A1 | 12/2019 | Plank et al. |
| 2020/0013574 A1 | 1/2020 | Krauss et al. |

FOREIGN PATENT DOCUMENTS

| | | |
|---|---|---|
| DE | 102014217332 A1 | 3/2016 |
| DE | 102014218831 A1 | 3/2016 |
| DE | 102014218910 A1 | 3/2016 |
| DE | 102015217108 A1 | 3/2016 |
| DE | 102014224173 A1 | 6/2016 |
| DE | 102015216981 A1 | 6/2016 |
| DE | 102015226475 A1 | 11/2016 |
| DE | 102016201651 A1 | 11/2016 |
| DE | 102016202827 A1 | 11/2016 |
| DE | 102015210479 A1 | 12/2016 |
| DE | 102015225243 A1 | 12/2016 |
| DE | 102016201659 A1 | 12/2016 |
| DE | 102015216023 A1 | 2/2017 |
| DE | 102016205196 A1 | 10/2017 |
| DE | 102016217425 A1 | 3/2018 |
| DE | 102016221093 A1 | 4/2018 |
| DE | 102017201239 A1 | 7/2018 |
| DE | 102017205003 A1 | 9/2018 |
| DE | 102017205004 A1 | 9/2018 |
| DE | 102017211900 A1 | 1/2019 |
| DE | 102017212477 A1 | 1/2019 |
| DE | 102017214903 A1 | 2/2019 |
| DE | 102017214907 A1 | 2/2019 |
| DE | 102017215820 A1 | 3/2019 |
| EP | 0949734 A2 | 10/1999 |
| EP | 1294068 A2 | 3/2003 |
| EP | 2321836 A1 | 5/2011 |
| WO | WO 2010026013 A1 | 3/2010 |

CIRCUIT BREAKER, REMOVABLE DISPLAY, AND ELECTRONIC TRIP UNIT FOR A CIRCUIT BREAKER

FIELD AND BACKGROUND OF THE INVENTION

The invention relates to the technical field of a circuit breaker and to a display a display for a circuit breaker. The circuit breaker has input and output connections for conductors of the low-voltage circuit, wherein the low-voltage circuit can be interrupted or closed inside the circuit breaker. A current sensor determines the level of the electric current in the low-voltage circuit and is connected to an electronic trip unit that has a display for displaying information and interrupts the low-voltage circuit if current limit values or current/time limit values are exceeded.

Circuit breakers are protection devices that function in a similar way to a fuse. Circuit breakers monitor the current flowing through them by means of a conductor and interrupt the electric current or flow of energy to an energy sink or a load, which is referred to as tripping, when protection parameters, such as current limit values or current/time period limit values, that is to say when a current value is present for a certain time period, are exceeded. Interruption is performed, for example, by contacts of the circuit breaker, which are opened. In contrast to a fuse, these protection parameters or response values can be adjusted in the case of a circuit breaker, for example by means of a control unit, such as an electronic trip unit.

Particularly for low-voltage circuits or networks, there are different types of circuit breakers, depending on the level of the provided electric current in the electrical circuit. Within the context of the invention, circuit breakers mean in particular switches as are used in low-voltage installations for currents of from 25 or 63 to 6300 amps. More specifically, enclosed circuit breakers are used for currents of from 25 or 63 to 1600 amps, in particular from 125 to 630 or 1200 amps. Exposed circuit breakers are used in particular for currents of from 630 to 6300 amps, more specifically from 1200 to 6300 amps.

Exposed circuit breakers are also referred to as air circuit breakers, ACB for short, and enclosed circuit breakers are referred to as molded case circuit breakers or compact circuit breakers, MCCB for short.

Low voltage means voltages of up to 1000 volts AC or 1500 volts DC. Low voltage also means voltages that are higher than the extra-low voltage at values of 50 volts AC or 120 volts DC.

Within the context of the invention, circuit breakers mean circuit breakers having an electronic trip unit, ETU for short, which serves as a control unit. The control unit monitors the level of the electric current measured by sensors such as a Rogowski transformer (Rogowski coil) and additionally the voltage or/and other parameters of the electrical circuit in a similar manner and interrupts the electrical circuit if threshold values are exceeded.

In general, circuit breakers have a display or a display unit. Protection parameters, set values or/and measured values, etc. can be displayed thereon. The screen content of this display is fixed.

By way of example, circuit breakers according to the prior art are disclosed in the following patent applications:
DE 10 2014 217 292 A1; DE 10 2014 217 332 A1;
DE 10 2015 217 108 A1; DE 10 2014 218 831 A1;
DE 10 2014 218 910 A1; DE 10 2016 201 651 A1;
DE 10 2015 226 475 A1; DE 10 2015 216 981 A1;
DE 10 2016 202 827 A1; DE 10 2016 201 659 A1;
DE 10 2015 210 479 A1; DE 10 2014 224 173 A1;
DE 10 2015 216 023 A1; DE 10 2016 217 425 A1;
DE 10 2016 205 196 A1; DE 10 2016 221 093 A1;
DE 10 2017 211 900 A1; DE 10 2017 201 239 A1;
DE 10 2017 205 003 A1; DE 10 2017 205 004 A1;
DE 10 2017 212 477 A1; DE 10 2017 214 903 A1;
DE 10 2017 214 907 A1; DE 10 2017 215 820 A1.

WO 2010/026013 A1 discloses a user interface for an electronic switch that is provided for low-voltage applications. A display of the user interface is removable.

Furthermore, DE 10 2015 225 243 A1 discloses an electrical switch for switching an electric current. Said switch has a trip unit, wherein part of the trip unit is mountable and removable.

SUMMARY OF THE INVENTION

The object of the present invention is to improve a circuit breaker with a display of the type mentioned in the introduction, in particular to make the use of a display or what is displayed on the display more variable.

This object is achieved by means of a circuit breaker as claimed and a display as claimed.

A circuit breaker for a low-voltage circuit, comprising input and output connections for conductors of the low-voltage circuit, wherein the low-voltage circuit can be interrupted or closed inside the circuit breaker, comprising a current sensor that determines the level of the electric current in the low-voltage circuit and is connected to an electronic trip unit (ETU) that has a display for displaying information and interrupts the low-voltage circuit if current limit values or current/time limit values are exceeded, is designed according to the invention in such a way that the display is designed to be removable.

This has the advantage of providing a removable display that is not required during continuous operation of the circuit breaker, since a display is often not necessary in this case. Malfunction, maintenance and start-up are the main scenarios for which a user or a customer requires a (front) display. For this reason, a removable display is provided that the user or customer is able to remove and install.

Advantageous configurations are specified in the dependent claims.

In one advantageous configuration of the invention, the display is designed to snap or latch on to the electronic trip unit (ETU).

This has the particular advantage of providing a simple option for removing and installing the display.

In one advantageous configuration of the invention, the display also has an input functionality in addition to a display functionality.

This has the particular advantage that, on the one hand, inputs via the display are possible, with the result that a compact realization of an output and input interface is possible, and on the other hand, it is not possible to make any changes to the setting parameters of the circuit breaker when the display has been removed.

According to the invention, the removable display has a sensor for determining an inclination or an angle of a horizontal or vertical position of the display. The display is also designed in such a way that the content of the displayed information is adjusted depending on a horizontal or vertical mounting of the display, such that the displayed information can be read in a user-friendly manner.

This has the particular advantage that the display can be mounted in an arbitrary manner and the alignment of the displayed information on the display can be automatically adjusted in accordance with the position of the display, with the result that said information can be read, generally horizontally, in a user-friendly manner. Universal positioning of the display is therefore made possible.

In one advantageous configuration of the invention, the sensor is an inclination sensor, an angle sensor or a position sensor. This has the particular advantage that a simple option for position determination, that is to say determination of an inclination or angle, in particular of a horizontal or vertical position of the display, is made possible.

According to the invention, the display has a display microcontroller, which is connected to the sensor, for controlling the display of the displayed information.

This has the particular advantage of providing an implementation for displaying information in a manner suitable for the user.

In one advantageous configuration of the invention, the electronic trip unit (ETU) has a first microcontroller that in particular monitors the exceedance of current limit values or current/time limit values and a second microcontroller that in particular provides the information to be displayed on the display.

This has the particular advantage of providing a separation between protection functions and display information in the electronic trip unit, such that the protection functionality is always provided and the display functionality is processed separately.

In one advantageous configuration of the invention, the electronic trip unit (ETU) and the display are designed in such a way that, if the display is connected to the electronic trip unit, the information to be displayed is transmitted from the second microcontroller to the display and is displayed thereon in the correct position.

This has the particular advantage that the control of the display settings is implemented separately from the protection functionality of the circuit breaker and reliable operation of the circuit breaker is therefore provided.

In one advantageous configuration of the invention, a USB interface is provided for the electrical connection between the electronic trip unit (ETU) and the display.

This has the particular advantage of providing a simple, standardized and cost-effective option for communication between the electronic trip unit and the display.

In one advantageous configuration of the invention, the display has an LCD display.

This has the particular advantage of providing a simple display option for the display.

In one advantageous configuration of the invention, the display has a power supply unit.

This has the particular advantage of providing a separate energy supply for the display, such that the external voltage supply can be of simplified design. Only one operating voltage needs to be supplied, and all further voltages are generated internally by the power supply unit itself.

In one advantageous configuration of the invention, the display has a keypad or touch control for an input functionality.

This has the particular advantage of providing a simple input option for the display.

In one advantageous configuration of the invention, the circuit breaker is designed in such a way that different orientations with which the information can be displayed can be selected.

This has the particular advantage that the display can also display the information in a fixed orientation that can deviate from the usual orientations.

In one advantageous configuration of the invention, the electronic trip unit (ETU) is designed in such a way that different menu structures can be programmed, which are stored in the second microcontroller and, in the case of a connected display (DISP), are displayed thereon.

This has the particular advantage that the display information is designed to be configurable. The display information can therefore be individually adapted to the users or customers or by said users or customers.

In one advantageous configuration of the invention, the electronic trip unit (ETU) is designed in such a way that application tasks assigned to the second microcontroller can be adjusted or changed.

This has the particular advantage that the application tasks are designed to be configurable. The application tasks can therefore be individually adapted to the users or customers or by said users or customers.

According to the invention, a removable display for a circuit breaker according to one of the preceding configurations is claimed in parallel, having the same and further advantages.

In one advantageous configuration of the invention, the removable display is designed for different types (or multiple types) of electronic trip units or circuit breakers.

This has the particular advantage that only one display is needed for different circuit breakers, for example in an installation, for example carried by a service engineer, in order to configure the circuit breaker in the case of malfunction, maintenance or start-up, for example. Manipulation of the circuit breaker is also possibly made difficult as a result of the removed display.

All configurations, both in the dependent form referring back to the independent patent claim(s) and referring back only to individual features or combinations of features of patent claims, improve a (low-voltage) circuit breaker with a display.

The described properties, features and advantages of this invention and the manner in which they are achieved become clearer and more distinctly comprehensible in connection with the following description of the exemplary embodiments, which are explained in more detail in connection with the drawing.

DETAILED DESCRIPTION OF THE INVENTION

Figure 1:
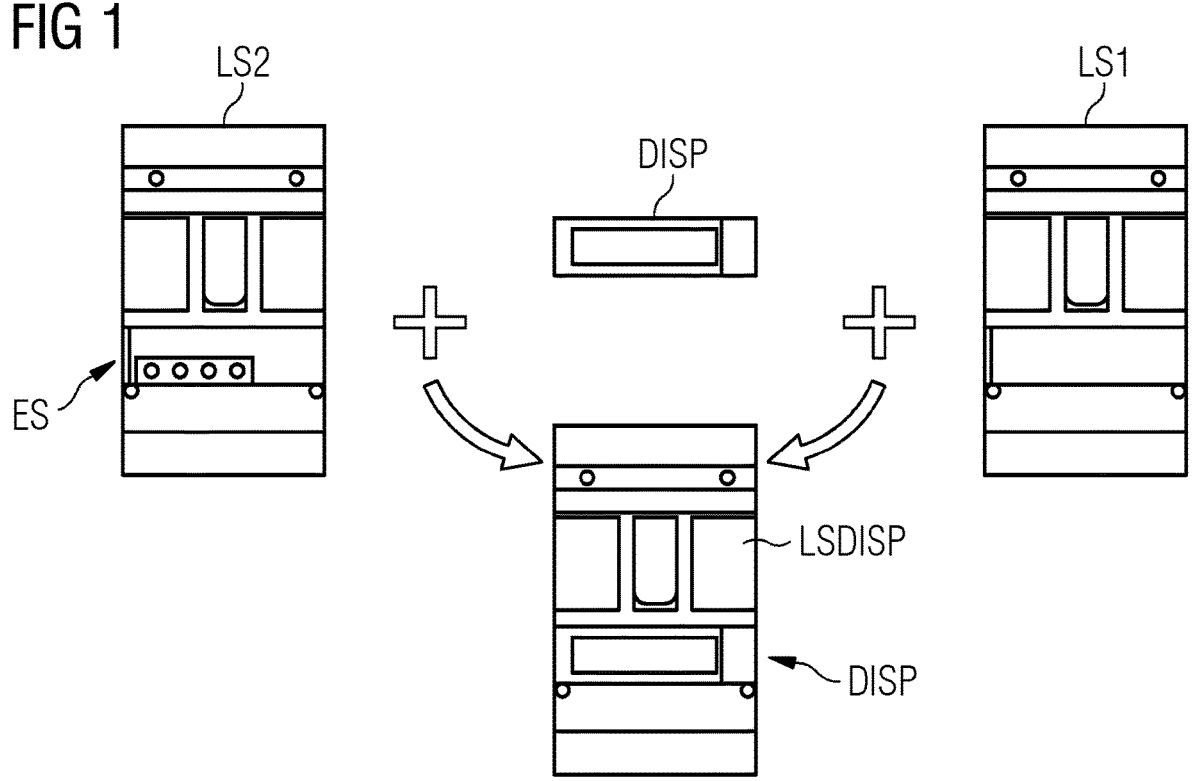
FIG. 1 shows a schematic illustration with circuit breakers for explaining the invention.

The upper region of FIG. 1 shows a first circuit breaker LS1, a second circuit breaker LS2 and a single display DISP. The first and second circuit breakers LS1, LS2 in the upper region do not have a display. By way of example, the first and second circuits breakers LS1, LS2 are low-voltage circuit breakers, such as molded case circuit breakers (MCCB) in the example according to FIG. 1. The first circuit breaker LS1 is a circuit breaker of a first type or of a first design. The second circuit breaker LS2 is a circuit breaker of a second type or of a second design that differs from the first circuit breaker LS1. By way of example, the second circuit breaker LS2 has adjusting elements ES on its front side, using which parameters such as threshold values or tripping characteristics of the second circuit breaker LS2 can be adjusted. The first circuit breaker LS1 does not have these adjusting elements.

In the lower region, a circuit breaker LSDISP is shown, such as a circuit breaker of the first or the second type LS1, LS2 for example, which has a mounted display DISP.

If the circuit breaker LSDISP is a circuit breaker of the second type LS2, the adjusting elements ES are hidden by the mounted display DISP. An adjustment is then possible via the display DISP, for example, which in this case has an input functionality.

If the circuit breaker LSDISP is a circuit breaker of the first type LS1, an input functionality is enabled for the circuit breaker by the mounted display DISP having said input functionality.

Figure 2:
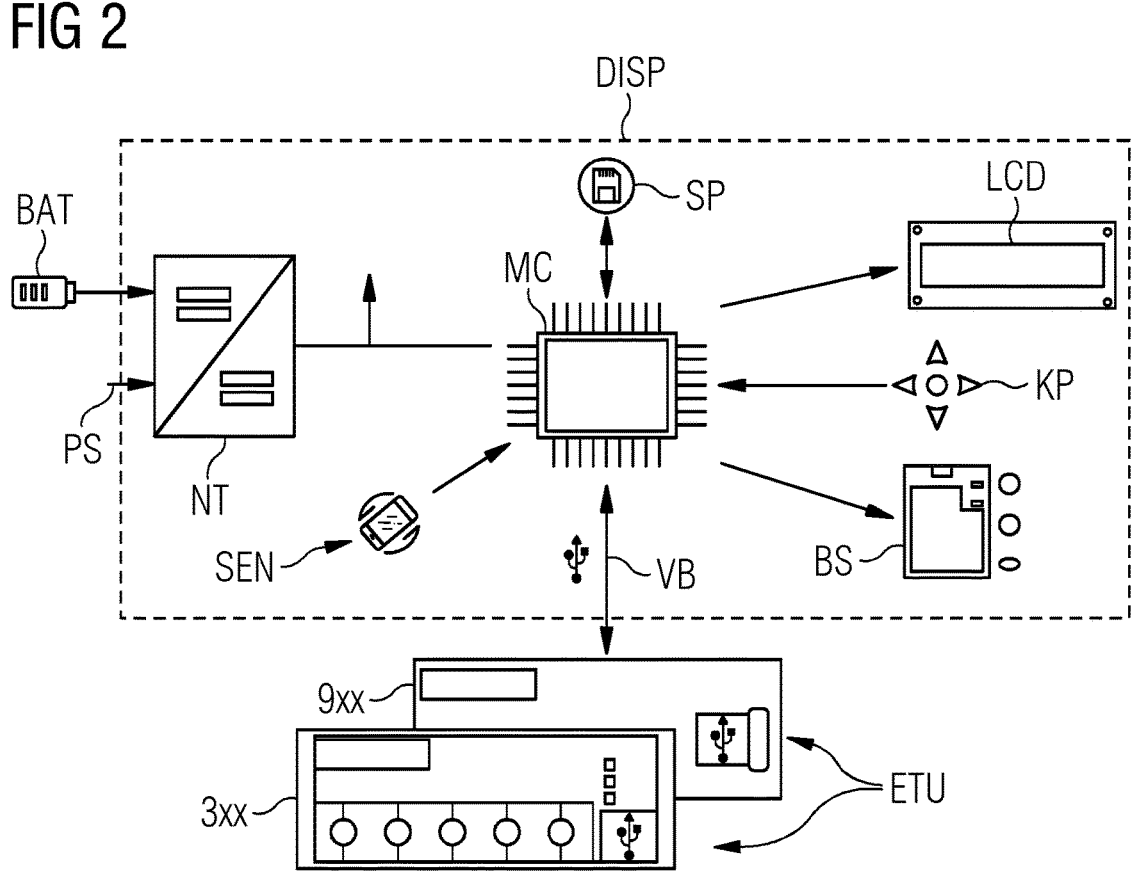
FIG. 2 shows a schematic illustration of a display for explaining the invention.

FIG. 2 shows a schematic illustration of an exemplary display DISP. The display has a display microcontroller MC. Said display microcontroller is connected to a power supply unit NT for supplying energy to the display microcontroller MC or the display DISP. The power supply unit NT in turn has a connection PS for an (external) supply voltage. Alternatively or additionally, the power supply unit NT can be connected to an external or internal battery BAT, which enables or supports mobile and circuit-breaker-independent operation.

By way of example, the energy can be supplied by an interface on the front side of the electronic trip unit ETU.

A memory SP can also be provided, such as an EEPROM, which is connected to the display microcontroller MC.

The display DISP also has a display LCD, such as an LCD display or a dot matrix display. Light-emitting diodes can also be provided. This display LCD can in turn be connected to the display microcontroller MC.

The display DISP can also have an input functionality, such as a keypad KP, a touchpad/touch control, or the like. This can in turn be connected to the display microcontroller MC.

The removable display DISP has a sensor SEN for determining an inclination or an angle, in particular of a horizontal or vertical position of the display DISP.

Said sensor can in turn be connected to the display microcontroller MC. The sensor SEN can be an inclination sensor, an angle sensor or a position sensor.

The display or the display microcontroller MC can be designed in such a way that, in cooperation with the sensor SEN, the content of the displayed information is adjusted depending on a horizontal or vertical mounting of the display, such that the displayed information can be read in a user-friendly manner.

The display DISP also has an electrical connection VB, such as a wired or wireless interface, for example, such as a USB interface, Bluetooth interface or Zigbee interface, which can produce (or produces) a connection between the display DISP and the circuit breaker LS1, LS2, LSDISP, or the electronic trip unit ETU thereof.

Two electronic trip units ETU, 3xx, 9xx, are indicated in the example according to FIG. 2.

By way of example, the electronic trip unit 9xx can be incorporated in or assigned to the first circuit breaker LS1. By way of example, the electronic trip unit 3xx can be incorporated in or assigned to the second circuit breaker LS2.

According to the invention, a (secure) user interface BS can also be provided, via which customers can upload display presets. This user interface BS can in turn be connected to the display microcontroller MC, as shown in FIG. 2.

The display DISP can be designed to snap on (snap in) or latch. A snap-on display is therefore provided, which the user or the customer is able to remove and install.

If the customer intends to use the same display DISP for multiple circuit breakers/devices, the display should be reconfigured according to the invention.

In devices of the prior art, the display contents do not adapt to the orientation of the circuit breaker. That is to say, if the device is mounted horizontally (vertically), for example, the text on the display is always displayed in landscape format, for example.

If a customer would like to also see, for example, measured values of the circuit breaker in another format, for example a diagram instead of numbers, the display generally cannot be changed.

According to the invention, a dedicated application controller/(further) second microcontroller will or can be provided in each electronic trip unit ETU in addition to the (first) microcontroller responsible for the protection functions.

The electronic trip unit ETU has a protection control. Protection settings and protection algorithms are controlled by way of this protection control. The set protection parameters should generally not be changed during continuous operation.

According to the invention, a second microcontroller that in particular provides the information to be displayed on the display is therefore provided in addition to the first microcontroller for the protection parameters/that in particular monitors the exceedance of current limit values or current/time limit values.

The functions of this second microcontroller (application microcontroller) can be changed during operation by the user or customer.

If a display DISP (display module) is connected to a circuit breaker/electronic trip unit ETU, in one configuration, the display DISP (display module) can adopt the settings from the second microcontroller that are stored therein, for example.

If the display DISP is connected to another circuit breaker/another electronic trip unit ETU, the display or display presets change as a result.

In one configuration, the customer can download different presets to the second microcontroller/application controller. The customer can, for example, download templates for display configurations. These templates can be modified, wherein customer-specific displays are possible.

By way of example, the customer can also select the orientation of the displayed information on the display DISP.

The physical form factor of the displays does not change, the formatting and the content of the displays are changed so as to correspond to the form factor and the display preferences of the customer. This means that the dimensions of the display (e.g. 80 mm*35 mm) are maintained regardless of whether or not the circuit breaker is rotated by 90 degrees. The form factor also does not change (logically) if another device (circuit breaker) has been connected.

The way in which the information is displayed does change, however. If the switch is rotated, the display changes in such a way that it is still readable, but the ratio is now, for example, 35 mm*80 mm. It is therefore necessary for the information to be rearranged in the display in a manner according to the invention, e.g. automatically.

The idea is also for there to be a basic set of display images (for example 20 displays with predefined contents). The user/customer can partially deactivate them and in turn add newly created display images as desired.

For example, the customer can change the menu structure of the displayed information on the display DISP according to their wishes. By way of example, they can download a "menu mask", using which the number of parameters of interest is set or reduced. Using said menu mask, they do not have to look through all the parameters and can just see the parameters that are of interest to them. They can reset this mask at any time, for example using external software.

According to the invention, a further/second microcontroller is used in the electronic trip unit, which microcontroller can be loaded with presets for displaying information on a display DISP and communicates with the display DISP (display module) without modifying the first (protection) microcontroller. A simple extension of existing electronic trip units is therefore possible.

The protection microcontroller is secure. The customer has the option to adjust the product/the display. The display DISP (display module) can automatically change its settings depending on which electronic trip unit ETU it is connected to. The information on the display is displayed in the correct position such that it can be read in a user-friendly manner.

Although the invention has been described and illustrated more specifically in detail by means of the exemplary embodiment, the invention is not restricted by the disclosed examples and other variations can be derived therefrom by a person skilled in the art without departing from the scope of protection of the invention.

The invention claimed is:

1. A circuit breaker for a low-voltage circuit having input connections and output connections for conductors of the low-voltage circuit, the circuit breaker comprising:
   a current sensor for determining a level of an electric current in the low-voltage circuit, said current sensor being connected to an electronic trip unit that has a display for displaying information and that is configured to interrupt the low-voltage circuit if current limit values or current/time limit values are exceeded;
   said display of said electronic trip unit being a removable display;
   said display having a sensor for determining an inclination or an angle of a horizontal or vertical position of said display, and being configured such that a content of displayed information is adjusted depending on a horizontal or vertical mounting of said display, thus enabling the displayed information to be read in a user-friendly manner; and
   said display having a display microcontroller, connected to said sensor, for controlling a display of the displayed information.

2. The circuit breaker according to claim 1, wherein said removable display is configured to snap or latch on to said electronic trip unit.

3. The circuit breaker according to claim 1, wherein said display has an input functionality in addition to a display functionality.

4. The circuit breaker according to claim 1, wherein said sensor is a sensor selected from the group consisting of an inclination sensor, an angle sensor, and a position sensor.

5. The circuit breaker according to claim 1, wherein said electronic trip unit comprises a first microcontroller and a second microcontroller.

6. The circuit breaker according to claim 5, wherein said first microcontroller is configured to monitor an exceedance of current limit values or current/time limit values, and said second microcontroller is configured to provide the information to be displayed on said display.

7. The circuit breaker according to claim 5, wherein said electronic trip unit and said display are configured such that, when the display is connected to said electronic trip unit, the information to be displayed is transmitted from said second microcontroller to said display and displayed thereon in a correct position.

8. The circuit breaker according to claim 1, which comprises a universal serial bus interface for an electrical connection between said electronic trip unit and said display.

9. The circuit breaker according to claim 1, wherein said display has an LCD display.

10. The circuit breaker according to claim 1, wherein said display has a power supply unit.

11. The circuit breaker according to claim 1, wherein said display has a keypad or a touchpad or touch control for an input functionality.

12. The circuit breaker according to claim 1, wherein the circuit breaker is configured to enable different orientations with which the information can be displayed.

13. The circuit breaker according to claim 1, wherein said electronic trip unit is configured to enable mutually different menu structures to be programmed, with the menu structures being stored in a second microcontroller of said electronic trip unit and, when said display is connected, to be displayed thereon.

14. The circuit breaker according to claim 1, wherein said electronic trip unit is configured to enable application tasks assigned to a second microcontroller of said electronic trip unit to be adjusted or changed.

15. A removable display for a circuit breaker, the removable display comprising:
   a sensor for determining an inclination or an angle of a horizontal or vertical position of the display, and wherein a content of a displayed information is adjusted depending on a horizontal or vertical mounting of the display, to enable the displayed information to be read in a user-friendly manner; and
   a display microcontroller connected to said sensor, for controlling a display of the displayed information.

16. The removable display according to claim 15, configured for connection by snap or latch onto an electronic trip unit.

17. The removable display according to claim 15, configured for mutually different types of electronic trip units or circuit breakers.

* * * * *